United States Patent
Joukov et al.

(10) Patent No.: US 9,262,507 B2
(45) Date of Patent: *Feb. 16, 2016

(54) SYSTEM AND METHOD FOR THE CLASSIFICATION OF STORAGE

(71) Applicant: INTERNATIONAL BUSINESS MACHINES CORPORATION, Armonk, NY (US)

(72) Inventors: Nikolai Joukov, Stony Brook, NY (US); Amitkumar M. Paradkar, Mohegan Lake, NY (US); Birgit M. Pfitzmann, Wettswil (CH); William R. Reohr, Ridgefield, CT (US); Peter Urbanetz, Wadenswil (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/698,379

(22) Filed: Apr. 28, 2015

(65) Prior Publication Data

US 2015/0242489 A1  Aug. 27, 2015

Related U.S. Application Data

(63) Continuation of application No. 13/468,449, filed on May 10, 2012, now Pat. No. 9,037,587.

(51) Int. Cl.
G06F 17/30 (2006.01)

(52) U.S. Cl.
CPC ........ *G06F 17/30598* (2013.01); *G06F 17/301* (2013.01); *G06F 17/302* (2013.01); *G06F 17/30091* (2013.01); *G06F 17/30194* (2013.01)

(58) Field of Classification Search
CPC .................................................. G06F 17/301
See application file for complete search history.

(56) References Cited

U.S. PATENT DOCUMENTS

| 7,272,644 | B1 | 9/2007 | Kumar |
| 7,523,274 | B2 | 4/2009 | Ryu et al. |

(Continued)

FOREIGN PATENT DOCUMENTS

CN          101281521 A        10/2008

OTHER PUBLICATIONS

IBM. "Specification: Ultrastar 18XP/9LP/9ZX Parallel SCSI Dick Drive Logical Interface Specification for 18.2GB, 9.1GB and 4.5GB Drives" Document No. AS05-0000-00. Release 6.0. Mar. 1998. pp. 1-286.

(Continued)

*Primary Examiner* — William Spieler
(74) *Attorney, Agent, or Firm* — Tutunjian & Bitetto, P.C.; Louis J. Percello

(57) ABSTRACT

A classification system executing on one or more computer systems includes a processor and a memory coupled to the processor. The memory includes a discovery engine configured to navigate through non-volatile memory storage to discover an identity and location of one or more files in one or more computer storage systems by tracing the one or more files from file system mount points through file system objects and to disk objects. A classifier is configured to classify the one or more the files into a classification category. The one or more files are associated with the classification category and stored in at least one data structure. The one or more files are classified using an installed storage driver method. Methods are also provided.

20 Claims, 10 Drawing Sheets

(56) References Cited

U.S. PATENT DOCUMENTS

| | | |
|---|---|---|
| 2005/0203964 A1 | 9/2005 | Matsunami et al. |
| 2006/0218367 A1 | 9/2006 | Ukai et al. |
| 2006/0265428 A1 | 11/2006 | Chai et al. |
| 2007/0185917 A1 | 8/2007 | Prahlad et al. |
| 2009/0192979 A1 | 7/2009 | Lunde |
| 2009/0307743 A1 | 12/2009 | Azagury et al. |
| 2010/0198797 A1 | 8/2010 | Wideman |
| 2010/0299489 A1 | 11/2010 | Balachandriah |
| 2010/0319060 A1 | 12/2010 | Aiken et al. |
| 2011/0302139 A1 | 12/2011 | Ueoka |

OTHER PUBLICATIONS

Joukov, N., et al. "Application-Storage Discovery" Proceedings of of SYSTOR 2010: The 3rd Annual Haifa Experimental Systems Conference. ACM International Conference Proceeding Series ACM 2010. May 2010. (14 Pages).

International Search Report and Written Opinion for International Application No. PCT/US2013/040568 issued on Dec. 2, 2013 (16 Pages).

Storage Classification Table - 10

| Host Name "CLIENT_HOST_NAME" 12 | Mount Point "MOUNTPOINT" 14 | File System "FILESYS_TYPE" 16 | CLASSIFICATION 18 |
|---|---|---|---|
| System1 | /informix/dbcores | JFS2 | Ldisk |
| System2 | /boot | EXT3 | Ldisk |
| System3 | /opt/dataset1 | GFS2 | Ldisk |
| System4 | Z: | CIFS | NAS |
| System5 | E: | NTFS | RAID |
| System6 | E: | NTFS | Removable |
| System7 | K: | NTFS | SAN |

FIG. 1

SYSTEM AND METHOD FOR THE CLASSIFICATION OF STORAGE

RELATED APPLICATION INFORMATION

This application is a Continuation application of U.S. patent application Ser. No. 13/468,449 filed on May 10, 2012, incorporated herein by reference in its entirety.

BACKGROUND

1. Technical Field

The present invention relates to discovery, migration, and transformation processes of server and storage systems and, more particularly, to systems and methods for rapid and accurate classification of computer storage.

2. Description of the Related Art

Computer technology evolves at an extremely rapid rate. According to the often cited Moore's law, every two years the capacity of a memory chip doubles, and the number of processors on a processor chip double. A similar "law" applies to computer storage. Unfortunately, the benefits associated with this phenomenal growth of computer and storage technology cannot easily be integrated into a running Information Technology (IT) center, or, data center, which must continue to handle "live" processing requests (e.g., banking transactions, production machinery controlling, weather monitoring, or searches) while IT equipment and programs are being updated and serviced. Data centers cannot be easily shut down since their activities are needed to keep businesses, etc. running. Modernizing an IT center is a delicate process with many intricacies that require not only an understanding of the underlying configurations of the broader system but must also take into account the dependencies among operating programs (i.e. processes).

The complexities of managing a data center result from many contributing factors. For example, as a data center grows with demand, bottlenecks and competition for resources occur. Piecemeal patches must be quickly administered to resolve pressing problems. Given that the staff, charged with managing the center, is not constant, details of the center that are documented may not be documented in the same way. Moreover, software needs to be updated continuously to maintain compliance with new versions of software and new standards, which are continuously changing.

It is important, therefore, to be able to characterize both the software and hardware associated with the infrastructure of a data center quickly with the assistance of automated tools. Considering that fresh data is being generated second by second, and thus new storage must frequently be provisioned, by the center's staff, to preserve a growing heap of data, it is particularly important to be able understand upon what type of hardware that data is being stored, especially when the center is being modified or refurbished.

SUMMARY

A classification system executing on one or more computer systems includes a processor and a memory coupled to the processor. The memory includes a discovery engine configured to navigate through non-volatile memory storage to discover an identity and location of one or more files in one or more computer storage systems by tracing the one or more files from file system mount points through file system objects and to disk objects. A classifier is configured to classify the one or more the files into a classification category. The one or more files are associated with the classification category and stored in at least one data structure. The one or more files are classified using an installed storage driver method A method for classifying storage includes discovering an identity and location of one or more files in one or more computer systems; classifying the one or more files into a plurality of classification categories by resolving types of storage classifications by tracing the one or files from file system mount points through file system objects to disk objects; and associating the one or more files with the classification category in at least one data structure stored on a storage medium. The one or more files are classified using an installed storage driver method These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 1 is a diagram illustratively showing a storage classification table in accordance with one embodiment;

DETAILED DESCRIPTION OF PREFERRED EMBODIMENTS

Figure 2:
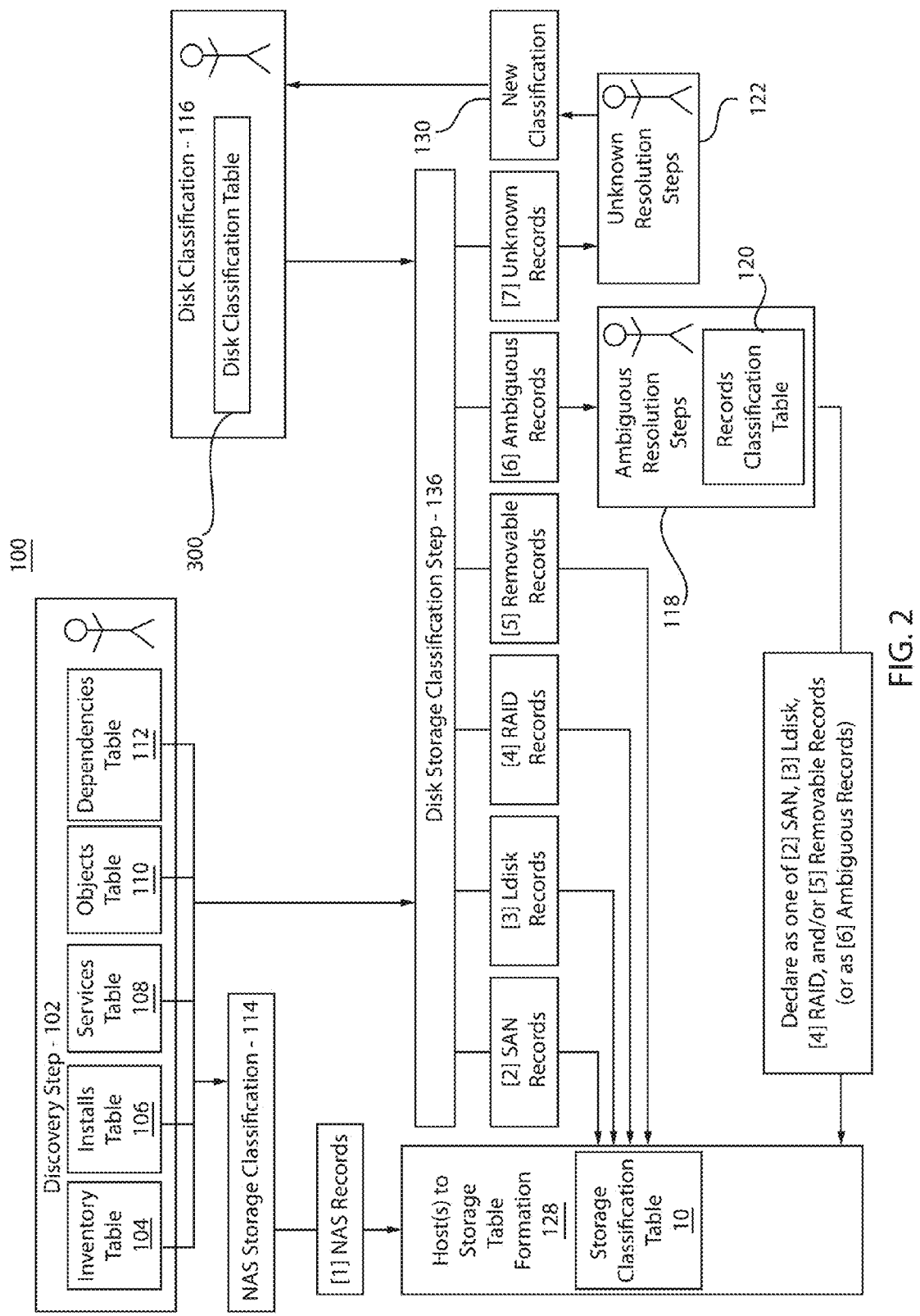
FIG. 2 is a block/flow diagram showing a system/method for storage discovery and classification in accordance with one embodiment.

In accordance with the present principles, methods and systems are provided that relate to discovery, migration, and transformation processes of server and storage systems, e.g., within a data center, to a new data center, within a collection of computers or computer-like systems, to a cloud, etc. To modernize, software and hardware structure, of an Information Technology (IT) center, needs to be discovered and classified before it may be transformed (e.g., modernized). Discovery and classification processes often involve careful and tedious work. The work is often costly and may potentially be error prone. To realize cost reductions and reduce errors, automation of the discovery and classification tasks are disclosed for storage infrastructure of IT centers (data center) or other memory storage (e.g., non-volatile memory storage).

The present principles provide for rapid and accurate classification of storage contained within the data center or other storage device or facility. For the purpose of increased accuracy, alternative storage classification methods are described. These may include a storage classification method operating on an abstraction level of file systems (e.g., installed storage driver classification method). Another storage classification method operates on an abstraction level of physical disks. In addition, logic for reconciling the results of multiple storage classification methods is described. One goal of the present principles is to classify a type of storage at a particular file system, characterized by a mount point. This is an important consideration in many applications where a transformation concerns enterprise applications, realized by software components such as web servers, application servers, and databases. Then, it is often important to know where data related to these enterprise applications (including configurations, program code, logs, etc. besides data in the narrower application sense) are actually stored. In particular, it is of interest to multiple transformation tasks whether storage is local to the server, or remote, and in the latter case whether it is network-attached storage (NAS) or a storage-area-network (SAN). NAS means that the remote system offers a file system abstraction, while SAN means that it offers a block-device abstraction. On the server, data is stored in file systems, and existing discovery methods can often trace the data to the file systems. Hence, a task of particular interest is to classify how the file systems are stored, so that together with existing methods, it may be known where application data are stored. The method may also be applied in cases where raw volumes are used by applications, as it happens in particular with some databases. In this case, we trace from the database or the logical volume in question instead of the file system. In the following, file systems are illustratively described as the starting point.

The injection of automation into otherwise human-intensive storage-classification tasks reduces costs and increases accuracies of the classification process and, moreover, reduces the costs of target transformations rendered upon a storage infrastructure because of the improved level of detail, accuracy, and standardization of the classification. These cheap and reliable methods can be applied to one or more particular storage types during a transformation process. Generally, the storage classifications are made for each server (host) file system present within one or more servers (hosts) that are being evaluated for upgrades or being readied for transformation. For each discovered file system, records generated by the methods may report the host, the mount point as the identification of the file system from the operating system and application point of view, a file system type, and a corresponding storage classification. Names for these concepts (or abstractions) vary slightly with different operating systems but the concepts, as such, exist widely; e.g., in one embodiment, the drive letters denoting most Windows™ file systems in the mount-point part of the records are included as they serve the same purpose for the applications. Classification names for a storage system may include, e.g., network attached storage (NAS), storage area network (SAN), Ldisk (denoting an individual local disk), redundant array of independent disks (RAID) (denoting a local RAID), Removable, and Ambiguous (i.e., none of the prior values is derivable with the available information).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, or a database query language, such as SQL, or a scripting language, such as Perl. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to the drawings in which like numerals represent the same or similar elements and initially to FIG. 1, a storage classification method will illustratively be described with reference to a storage classification table 10. FIG. 1 includes an intended output of an illustrative classification method (FIG. 2). One exemplary storage classification method operates on an abstraction level of file systems (called the installed storage driver classification method). The method is described in greater detail with respect to FIGS. 2 and 3, which depict an automated storage classification system/method 100 and a storage data model 200, respectively.

A purpose of the storage classification method 100 of FIG. 2 is to generate a storage classification table 10, of FIG. 1. For each discovered file system, records generated by the method 100 may report a host or server name 12 ("CLIENT_HOST_NAME"), mount point ("MOUNTPOINT") 14, file system type ("FILESYS_TYPE") 16, and corresponding storage classification ("CLASSIFICATION") 18. The host or server name 12 shows generic entries "System1, System2 . . . System7" for illustrative purposes. It should be noted that one or more file servers may exist per host. Mount point refers to specialized file system objects which are used to mount and provide an entry point to other volumes. Mount points can be created in a directory on a file system, which gives a reference to a root directory of the mounted volume. In fact, any empty directory can be converted to a mount point. The mounted volume can be formatted with any file system. The table 10 of FIG. 1 provides a way to classify the type of storage of the file system mounted at a particular mount point.

A more detailed description of each step for the classification method of FIG. 2 follows. Referring to FIG. 2, a block/flow diagram depicts a system/method to generate storage classification. This exemplary embodiment of storage classification works on the basis of file systems. Blocks in FIG. 2 with human stick figures may involve a degree of human intervention, but may be completely automated as well. The automated storage discovery and classification method 100 of FIG. 2 comprises a discovery step in block 102, a disk classification step in block 116, a NAS storage classification step in block 114, a disk storage classification step in block 136, and a host-to-storage table formation step in block 128. The discovery step in block 102 is preferably done in advance of the NAS classification step in block 114 and the disk storage classification step in block 136. The disk classification step in block 116 is preferably done in advance of the disk storage classification step in block 136. The disk classification step 116 is also preferably performed in advance of the execution of other steps of this method 100 and independently of the concrete execution of a discovery step 102. The host-to-storage table formation step in block 128 amalgamates the records generated in block 114 and 136 into the storage classification table 10 illustratively shown in FIG. 1. The entire method can be repeated as frequently as the input tables, generated by block 102 and 116, are modified.

The discovery is performed in block 102 using a computer system to collect storage data (e.g., on a client side) and to parse the collected data into tables (other embodiments may use other data structures). At least some part of block 102 is executed on the server where the file systems exist that are to be classified. Such a system generates or provides tables, e.g., inventory table 104, installs table 106, services table 108, objects table 110 and dependencies table 112. These tables 104-112 provide raw data for analysis. The raw data feeds logic of the NAS storage classification block 114 and the disk storage classification block 136. The inventory table 104 may include hardware or software inventories of systems to be analyzed. The inventory table 104 may be employed in other methods as described throughout but will be omitted from other FIGS. for simplicity.

Figure 3:
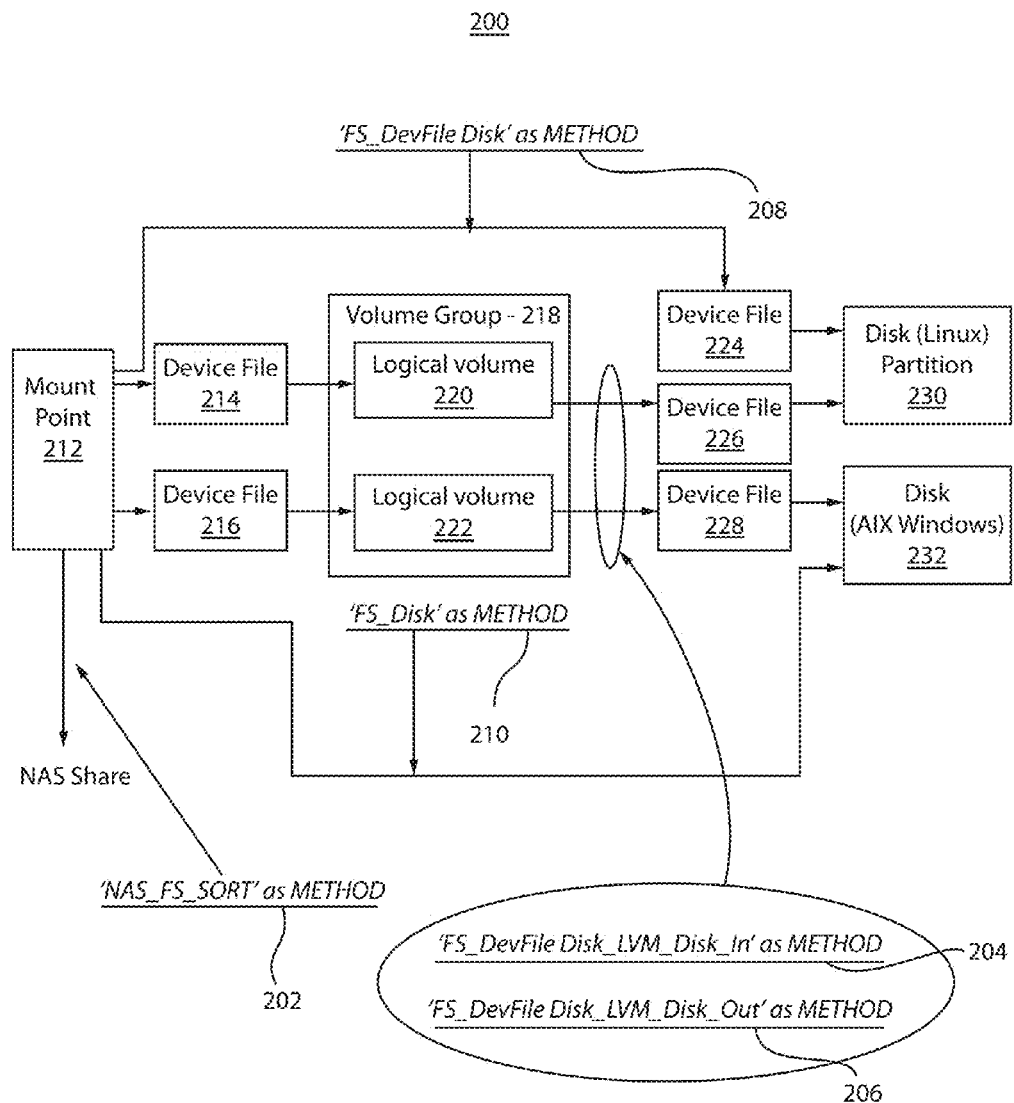
FIG. 3 is a block/flow diagram showing a storage data model in accordance with one embodiment.

In one embodiment, the tables may be generated in accordance with the Galapagos™ system of International Business Machines®. Another embodiment might use another discovery system such as IBM® Tivoli™ Application Dependency Manager. The steps following the discovery step 102 need to be able to generate storage data structures, representing the storage configured within the servers. Exemplary storage data structures are depicted in FIG. 3, i.e., which link file systems to disk objects in the way that they are seen on the server operating system.

Galapagos™ distinguishes three levels of middleware items, called installs, services, and objects (table 106, 108 and 110). It also treats file systems and storage as middleware, as their software construction fits well into the same data model. A first, outermost level of the middleware abstraction is that of installations. Installations can just be installed programs without running processes. There may be multiple installations of a certain product on a host, e.g., in several different versions. A second level of the middleware abstraction, services, typically corresponds to either running processes, or to services in the computer-to-computer communication sense, listening on ports. For the case of storage and file systems, the services may, to a degree, be considered as running processes embedded within an operating system.

Next, most services host something else. This can range from clear data objects, e.g., files or databases and database tables over specific active objects, e.g., queues to full applications. A Websphere Application Server™ (WAS) may host application programs. In the storage case, individual file systems are objects. All of these items, e.g., installs, services, and objects will be bundled together under the name "objects" for ease of reference. The dependency table 110 contains dependencies between different objects, e.g., that the data of a database are held within a particular file system, or that a file system is implemented on a particular logical volume. See FIG. 3.

Figure 4:
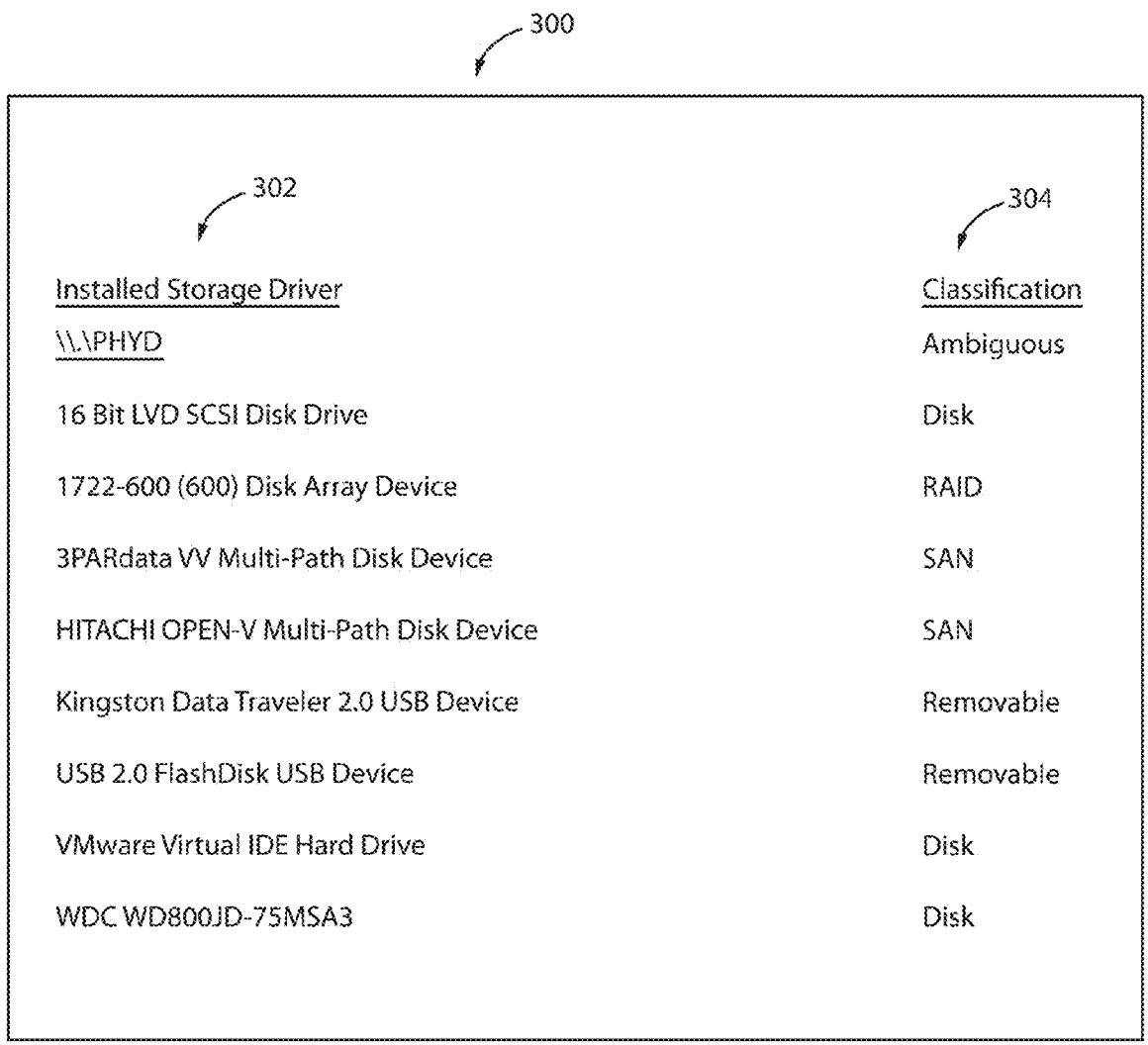
FIG. 4 is a diagram illustratively showing a disk classification table in accordance with one embodiment.

The disk classification block 116 employs a person to classify known storage drivers, which generate disk objects, and arrange them into a table, such as an exemplary disk classification table 300 (see FIG. 4). The disk classification table 300 is searched by the disk storage classification block 136 in the process of classifying disk objects, which were linked to host file systems. It should be understood that the disk category type may be further classified into protected and not protected (e.g., RAID) categories/classifications.

The NAS storage classification block 114 in this embodiment identifies NAS storage exclusively by file system types (because in NAS the remote server offers a file system abstraction, so there is no corresponding disk object on the server whose file systems are being classified). NAS file system types include, e.g., NFS %, CIFS, AFS %, or DFS where the "%" appended to NFS and AFS represents a wild card and thus covers file system types such as NFS, NFS4, NFSD, and NFSv3. Exemplary code used to classify storage as NAS resides in a sub query, denoted by the 'NAS_FS_SORT' as METHOD statement that is located within a SQL query hereinafter. A path from a mount point to NAS is noted as 'NAS_FS_SORT' as METHOD 202 on an illustrative storage data model 200 of FIG. 3.

The disk storage classification block 136 classifies file systems that are not NAS according to the disk objects that they are implemented. A link from the file system mount point to a disk is made by traversing from box to box, the objects (represented in the objects table 110) along the flow lines (represented in the dependencies table 112), which both are represented within the storage data model 200 of FIG. 3. In other words, the link is made by tracing tables from the file system mount points, through any intermediate file system objects, to the disk objects. Once a disk is obtained from this process, its classification can be obtained by first linking to the installation that created it, e.g., a storage driver, and then by looking the installed storage driver 302 up in the disk classification table 300 for the storage classification 304. Thus, the storage classification may be linked back to the mount point.

Exemplary code used to classify storage according to the disk classification block resides in the sub queries, denoted in FIG. 3 by: 'FS_DevFile_LVM_Disk_In' as METHOD 204, 'FS_DevFile_LVM_Disk_Out' as METHOD 206, 'FS_DevFile_Disk' as METHOD 208, 'FS_Disk' as METHOD 210 statements that are located within the SQL query section below (and also noted in FIG. 3). Here, FS=file system, LVM=logical volume manager, and DevFile=device file. The disk storage classification step in block 136 resolves storage types by tracing tables from file system mount points, through intermediate file system objects, through disk objects, through the installations (which created the disks), and finally to the classifications themselves.

The NAS classification block 114 and the disk storage classification block 136 together may be used to resolve storage types into a plurality of different classifications. In one embodiment, seven classifications may be employed producing records (e.g., rows in FIG. 1) and labeling them as [1] NAS records, [2] SAN records, [3] Ldisk records, [4] RAID records, [5] removable records, [6] ambiguous records, and [7] unknown records. Other classifications may also be included. In detail, the classifications include: [1] "NAS" indicates "network attached storage"; [2] "SAN" indicates "storage area network"; [3] "Ldisk" indicates a local SCSI disk without RAID protection; [4] "RAID" indicates a local SCSI disk with RAID protection; [5] "Removable" indicates storage that is detachable (e.g., a flash disk); [6] "Ambiguous" indicates that the classification, determined by the installed storage driver, cannot be resolved to one of [1] through [5]. The underlying storage of the "Ambiguous" record may be Ldisk, SAN, or RAID. [7] "Unknown" indicates that no classification in the disk classification table 300 exists for a discovered disk (generated by an installed storage driver).

Alternative steps of the method of FIG. 2 may further comprise an ambiguous resolution step in block 118 and an unknown resolution step, both of which may involve human intervention. Because of the ambiguous nature of the result of the previous steps, the ambiguous resolution step 118 may need a person to run additional commands on a host or storage console(s) to classify the storage or to investigate the physical server, network, or storage itself to classify the storage.

It is also contemplated that the ambiguous resolution block 118 may additionally have a built-in memory and logic that recognizes already processed ambiguous records, e.g., classified by a person during an earlier run, that now can be identified by their unique host names, and mount points. For these already processed ambiguous records, a correct classification can be sourced to the storage classification table 10 in the host(s) to storage table formation block 128 based on earlier results recorded in a records classification table 120. In this way, ambiguous records once resolved by a person always remain resolved in the records classification table 120 as one of [2] SAN records through [5] removable records. Hence, costly steps performed by a person are not lost each time the method of FIG. 2 is run again, in particular, during a relatively short time frame of discovery and classification that precedes a transformation. During this time, file systems are unlikely to change dramatically, and thus multiple iterations of discovery and classification may be made without the records classification table 120 changing substantially. The ambiguous resolution block may also contain automation related to other classification methods.

An unknown resolution block 122 employs a person to generate a new classification 130 for the installation of a storage driver that had not previously been included in the disk classification table 300. That new classification 130 is fed back to the disk classification block 116 so that the disk classification table 300 can be updated to include the new classification 130. Again, costly research/steps performed by a person, once completed, are not lost within the mostly automated storage discovery and classification method 102.

It should be noted that union statements within the SQL Query, described below, combine the classification records generated by each of the sub queries—'NAS_FS_SORT' as METHOD 202, 'FS_DevFile_LVM_Disk_In' as METHOD 204, 'FS_DevFile_LVM_Disk_Out' as METHOD 206, 'FS_DevFile_Disk' as METHOD 208, and [e] 'FS_Disk' as METHOD 210—together to generate the storage classification table 10, thus completing the host(s)-to-storage table formation step in block 128.

Referring to FIG. 3, a storage data model 200 is illustratively shown in accordance with one embodiment. The NAS storage classification block 114 of FIG. 2 identifies NAS storage exclusively by file system names. The logic used to classify storage as NAS resides in a sub query, denoted by the 'NAS_FS_SORT' as METHOD statement 202 that is located within a SQL query. A path from a mount point 212 to NAS is noted as 'NAS_FS_SORT' as METHOD 202 on the storage data model 200.

A link from the file system mount point 212 to a disk or disks 230 (e.g., on Linux) or 232 (e.g., on AIX or Windows™) is made by traversing from box to box, the objects (represented in the objects table 110) along the flow lines between boxes (represented in the dependencies table 112). The objects may include device files 214, 216, 224, 226 and 228, volume groups 218, logical volumes 220 and 222, etc. In other words, the link is made by tracing tables from the file system mount points 212, through any intermediate file system objects 214, 216, 218, 220, 222, 224, 226, and 228, to the disk objects 230, 232. Once a disk 230, 232 is obtained from this process, the disk is linked through the installs table 106 to the installed storage driver (which generated it), and then, with the installed storage driver 302 associated to the disk, the storage classification may be looked up in the disk classification table 300 (FIG. 4). The storage classification 304 is thus linked back to the mount point 212. Exemplary code used to classify storage according to the disk classification block in this embodiment resides in the sub queries: 'FS_DevFile_LVM_Disk_In' as METHOD 204, 'FS_DevFile_LVM_Disk_Out' as METHOD 206, 'FS_DevFile_Disk' as METHOD 208, 'FS_Disk' as METHOD 210 statements that are located within the SQL query section below.

Figure 5:
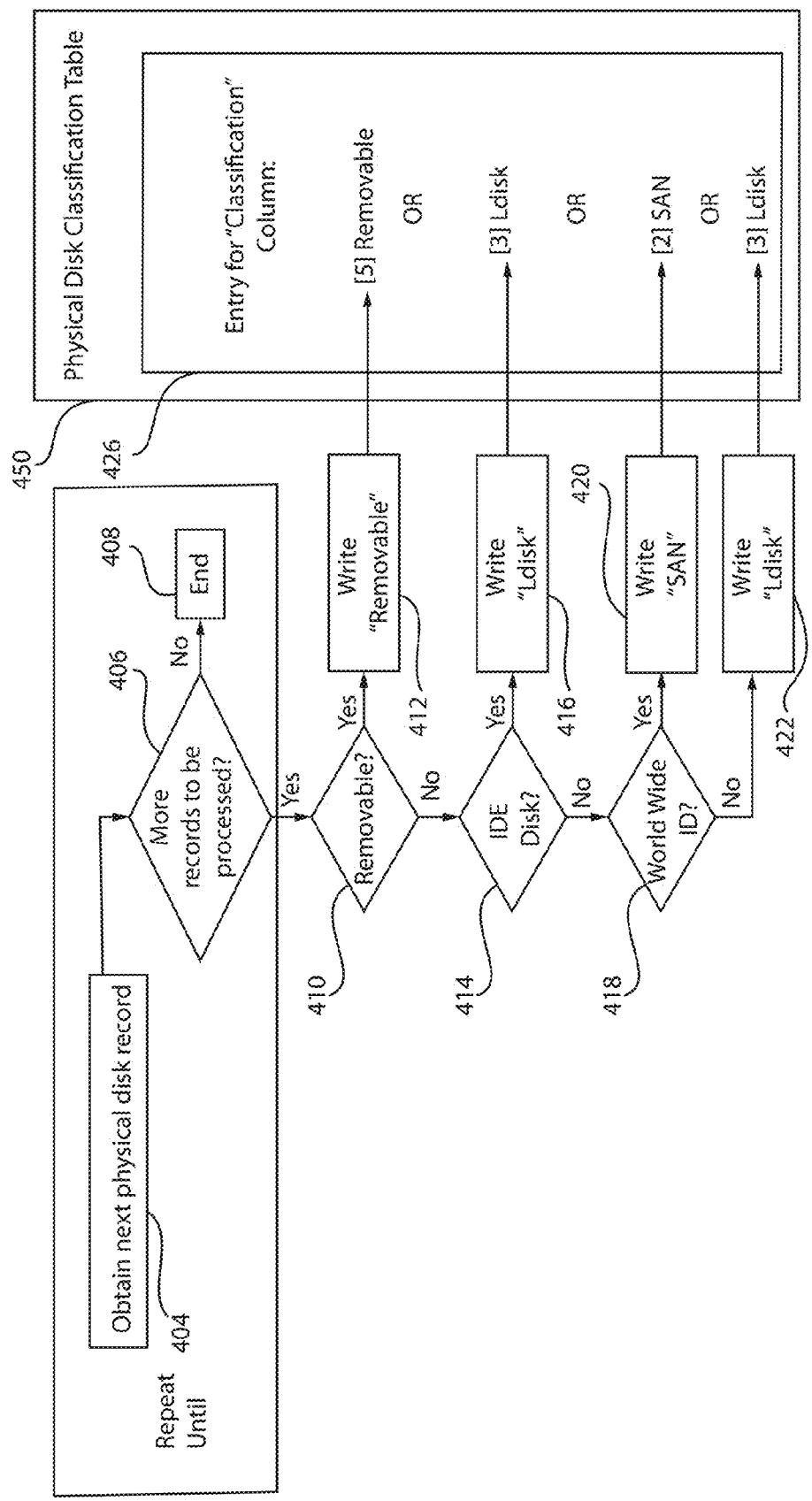
FIG. 5 is a block/flow diagram showing a system/method for physical disk classification that generates a physical disk classification table in accordance with one embodiment.

Referring to FIG. 4, an exemplary "Disk Classification Table" 300 is depicted that is used by one embodiment that links hardware/software drivers to storage classifications in accordance with the present principles. The table of FIG. 4 shows an Installed Storage Driver column 302 and a Classification column 304. The disk classification table 300 is depicted in the method 100 of FIG. 2. It should also be noted that an automated disk classification, which is differentiable from method 200 (FIG. 3) and disk classification table 300 (FIG. 4) in that it probes the physical disk object itself for the classification, is depicted in FIG. 5. Physical disk refers to the operating system notion of a disk, in contrast to a logical volume. Probing in this instance refers to querying the operating system object, or querying the operating system about this object. The physical disk in the sense of a material object may or may not reside in the same server where query is executed. This is in fact part of the classification that is desired in accordance with the present principles.

Referring to FIG. 5, physical disk classification method 400 introduces specific steps for characterizing physical disks. This physical disk classification method 400 extracts disk classifications from configurations and files representing the physical disks themselves. It generates a physical disk classification table 450 that will later be used by the storage classification system/method 600 of FIG. 7 to generate a storage classification table 610. Method 600 employs some similar procedures as those already described with respect to storage classification system/method 100 of FIG. 2, which generates storage classification table 10.

Figure 6:
FIG. 6 is a diagram illustratively showing a physical disk classification table in accordance with one embodiment.

A discovery process, to be described in more detail below, collects and catalogs the attributes necessary to answer some of the questions posed in the physical disk classification method 400. FIG. 6 depicts a Table 500 of attributes and their descriptions that are consumed (on a per disk object/record basis) while running the physical disk classification method 400.

The physical disk classification method 400 begins at physical disk layer in block 402, where a first or next physical disk record is obtained in block 404 in accordance with a check as to whether more records need to be processed in block 406. Block 402 is repeated for each record and is terminated in block 408 when no more records are found. In this method, each physical disk record passes through a series of questions: Is the disk removable in block 410? Is the disk part of the Integrated Drive Electronics (IDE) of a host system in block 414? Does the SCSI disk have a World Wide ID (WWID) in block 418? The question flow is interrupted by a positive—"yes"—response. If "yes," the classification of the record is written as "Removable" in block 412 in response to the question in block 410, "Ldisk" in block 416 in response to the question in block 414, "SAN" in block 420 in response to the question in block 418. If the responses to the questions in blocks 410, 414 and 418 are all "no," then the classification of the record is written as "Ldisk" in block 422. Once the physical disk classification is recorded, the method is repeated until there are no more records to be processed as controlled by block 402.

It should be understood that a more restricted number of disk classifications may be made using this method including, e.g., [2] SAN, [3] Ldisk, and [5] removable. It should also be understood that other similar commands and classifications may be employed instead of or in addition to those described. In this particular embodiment, a classification of hardware RAID—noted as "[4] RAID Records" in FIG. 2—may not be made while employing only the questions in block 410, 414, and 418. This example illustrates that alternative classification methods, like the method 100, may improve the quality of the classification relative to the method 400. However, it is contemplated that, with additional questions added to the flow, the physical disk classification method 400 may be extended to render more precise classifications like "RAID" and others.

Table 500 summarizes the attributes defined for the physical disk classification method 400. Within this table 500, a specific attribute 502 is named, described in a description and assigned to a database table and column name 506 (i.e., "Objects Table" 110, FIG. 2).

An additional discovery process is needed to populate the attributes described in Table 500. Some aspects of discovery have already been discussed in the description of discovery step 102 and storage data model 200. The physical disk discovery process, described hereafter, surfaces the information that answers questions in block 410, 414 and 418. The discovery process collects raw information utilized in classifying each attribute. An intermediate parsing step (code is not included in FIG. 5) helps classify the physical disk as "Removable," next "IDE," and finally "WWID" as shown in FIG. 6 noted in the specific attributes column 502. Subsequent paragraphs will describe the command to collect the raw information.

For Windows™ Operating Systems, raw information for "Removable" (question in block 410) and "IDE" (question in block 414) storage may be discovered from the "Windows Management Instrumentation" (WMI)—an interface through which hardware (i.e., software driver) management information may be exchanged via a Common Information Model standard. This may be performed more particularly by querying for "Select*from win32_system" using the Windows Management Instrumentation Query Language (WQL). For Linux Operating Systems, "Removable" and "IDE" Storage may be resolved by linking information collected from FDISK, "proc/usb," and "proc/ide." Using the commands "less /proc/usb/usb" and "less /proc/ide/ide," "Removable" and "IDE" descriptions may be obtained. Similar discovery processes are contemplated for other operating systems. It should also be understood that other similar commands may be employed instead of or in addition to those described.

If the SCSI disk has a Worldwide ID (WWID), then it is generated by a SAN. Hence, the classification is SAN according to block 418 of FIG. 5. The presence or absence of the world WWID may be checked by a query. This is a mere illustration. Other methods for discovering a WWID, or for determining a lack thereof, may be employed.

Figure 7:
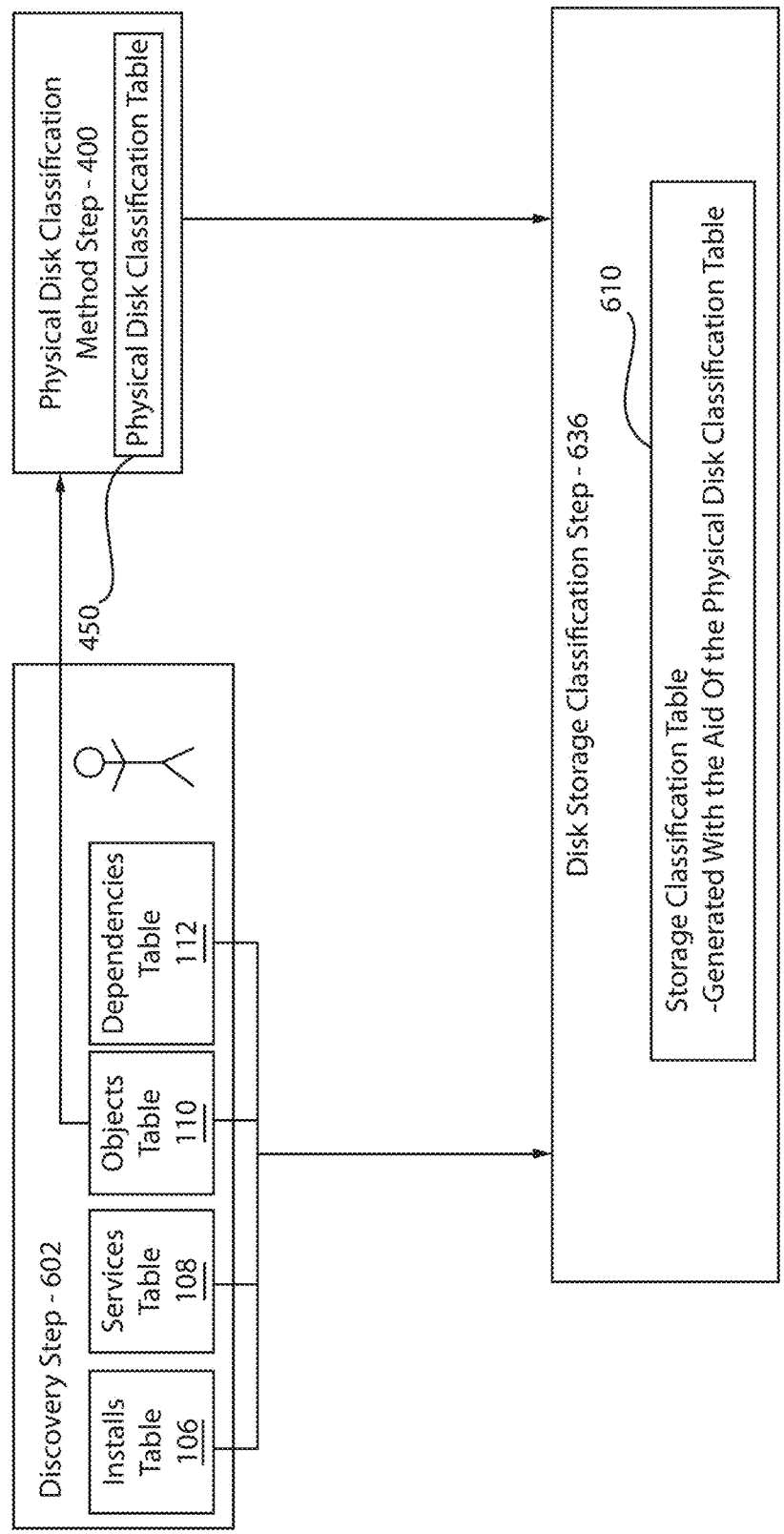
FIG. 7 is a block/flow diagram showing a system/method for physical disk storage classification in accordance with another embodiment.

Referring to FIG. 7, another storage classification method 600 is depicted which operates on the abstraction level of physical disks. FIG. 6 depicts a storage classification method 600. As before, blocks in FIG. 7 with human stick figures may involve a degree of human intervention, but may be completely automated as well. The method 600 includes a discovery step in block 602, the physical disk classification method step 400 (described in FIG. 5), and another disk to storage classification step 636. In more detail the disk to storage classification step 636 links the disk object—now classified and stored within the physical disk classification table 450—back to the file system mount point (or vice versa).

Once all the physical disk records have been classified in block 400, the disk records and their corresponding classifications may be linked to the mount point to generate a storage classification by following block 636 for the disk to storage classification step. This may proceed in either a forward or reverse direction with respect to a portion of the procedure described in the first classification method 100. The procedure primarily involves both the dependencies table 112 and objects table 110. In particular (for the reverse example), the linking of physical disks, now classified, to the mount point progresses from the disks 230, 232 of the storage data model 200 (FIG. 3), through the intervening boxes 214, 214, 218, 224, 226, 228 and to the mount point 212. The intervening traversal may involve objects—the boxes 214, 214, 218, 224, 226, 228 indicating intermediate file system objects, such as, device files 214, 216, 224, 226, and 228 and logical volumes 220, 222 and the dependencies (links or arrows connecting the boxes in FIG. 3). Both objects and dependencies are obtained by querying the objects table 110 and the dependencies table 112, respectively. Once all records are processed, a storage classification table 610 for one or more computers or an entire IT center is generated. The storage classification table 610 is similar or identical to that of table 10 of FIG. 1 within which the classification of file systems on servers/ hosts is rendered.

The primary difference between disk classification tables is that the physical disk classification table 500 contains disk records (of all discovered physical disks in the IT system) and their corresponding storage classifications, whereas the disk classification table 300, driver-based, may include the installed storage drivers and their corresponding storage classifications. The disk classification table 300, moreover, may employ a human to assign a storage classification to all known software drivers (which manage specific types of hardware).

Figure 8:
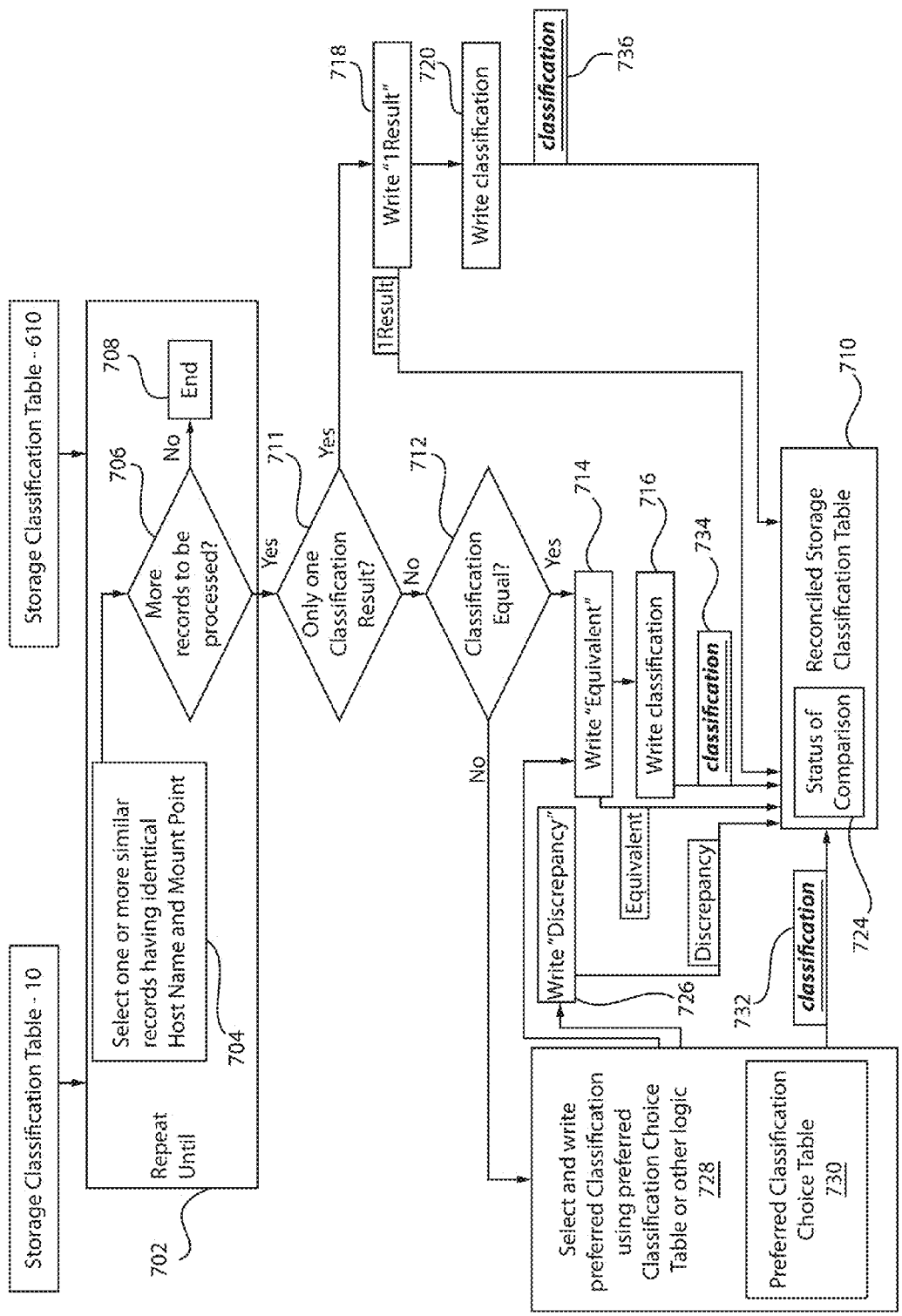
FIG. 8 is a block/flow diagram showing a system/method for reconciling/comparing a plurality of classification methods in accordance with another embodiment.

Alternative storage classifications may be reconciled by the method 700 (method to reconcile storage classifications), depicted in FIG. 8. Combining the storage classification methods 100 and 600 may improve accuracy of each classification rendered on a storage record and may enlarge the coverage of classifications across all storage records.

Referring to FIG. 8, a method to reconcile storage classifications 700 is shown in accordance with the present principles. The method 700 reconciles storage classifications starting with at least two distinct storage classification methods (e.g., method 100 (table 10) and method 600 (table 610). The first method 100 is represented by FIG. 2 and the second method is represented by FIG. 7. Method 700 reconciles, in block 712, the storage classification between the different classification methods (100 and 600) and generates a discrepancy flag in block 726 if the two (or more) classification methods yield different results. The discrepancy flag may be used to alert a migration engineer or system administrator of the possibility that an improper classification was made by the automated decision logic within one or more of the methods. Being alerted to such a problem, the migration engineer or system administrator may choose to resolve the discrepancy by examining both the actual hardware and the hardware state in more detail.

Beginning with the storage classification tables 10 and 610, a block 702 evaluates all records in one or both tables until completed. In block 704, one or more similar records are selected from one or both tables (10 and 610), where the common and expected case, in which a similar record exists in both, needs the records of both to have an identical Host Name and Mount Point. In block 706, a check is performed as to whether all records have been evaluated. If they have all been processed, the program goes to block 708 and terminates. Otherwise, a determination is made in block 711 as to whether only one classification result exists (e.g., 1) only one record with a particular Host Name and Mount Point exists or 2) only one of the similar records has a classification).

If only one classification result exists in block 711, a status flag, e.g., 1Result, is written to a status of comparison table 724 in a reconciled storage classification table 710 where reconciled results are stored. In block 720, this unique existing classification 736 for the Host Name and Mount Point is written to the reconciled storage classification table 710.

If more than one result is found for the Host Name and Mount Point in block 711, a determination is made in block 712 as to whether the classifications are equal. If the classifications are equal, an equivalent flag is written in block 714 to the status of comparison table 724. In block 716, a classification 734 for the Host Name and Mount Point is written to the reconciled storage classification table 710.

If the classifications are not equal in block 712, a preferred classification 732 may be selected from a preferred classification choice table 730 in block 728. After which, the preferred classification is written to the reconciled storage classification table 710 into status of comparison table 724. Block 728 provides logic that can determine if a discrepancy exists or can be resolved to provide an equivalency result. Alternately, other logic may be employed in block 728 to classify the record (e.g., rules such as "always select preferred classification of FIG. 7, when available). Other rules may apply as well. For example, because the RAID classification may be unique to method 100, as has been explained earlier, the similar record resulting from the classification method 600 may be classified as Ldisk. Both similar records, in this case, have been correctly classified. The RAID classification, however, is more precise than the Ldisk classification. Hence, the status of comparison 724 needs to be written into the reconciled storage classification table 710 after the other logic and rules of block 728 have had a chance to resolve the differences in the classifications. The writing of a discrepancy or equivalent flag, as the status of comparison 724, depends on whether a classification error was made by one method or a more precise classification was made by one method, respectively.

Not only may the classifications between or among the at least two exemplary methods be different (due to errors within tables), but also the scope of hardware coverage may vary among them. These may be primarily determined by the extent of the software (e.g., Operating Systems and Levels, File Systems) and hardware coverage that has been implemented in the discovery. Only one classification method may, for example, produce a result. There are three resolution flows in FIG. 8. The method logic steers the classification of each storage record through one of the three flows that results in classification 732, 734, 736. The classification for each record is written to the reconciled storage classification table 710.

Classification confidence diminishes from classification 734 to classification 736 to classification 732 (for classification 732, the exception is a more precise since the classification is made by one method). In the first classification 734, the classification methods indicate identical classification results, and thus the result of classification 734 is almost certain to be correct. In the second classification 736, only one classification result is available so it is written. In the third classification 732, a discrepancy is indicated, and, thus, a best choice has to be made. In the third classification 732, a default approach may be selected according to "other logic" in block 728. For example, the second classification method 600, (FIG. 7), may sometimes be selected over the first because, during execution, it may involve less human intervention than the first, at least with respect to classifying the physical disk. It may also be desirable to preserve the storage classification of the method 100, according to the preferred classification choice table 730 because more specific classifications like RAID may be made possible through such a method.

The preferred classification choice table 730 may contain some storage classifications obtained during execution of method 100 and some storage classifications obtained during execution of the method 600. The table 730 may also initially be formed by experts and later may also be modified by expert experience. It is further contemplated that the storage classification choice may depend on additional attributes associated with each record (Host and Mount Point pairs). Such an approach may generate additional products in the overall table. It is further contemplated that more than two methods, e.g., a plurality of methods, can be integrated into the decision logic of FIG. 8 without altering the decision flow substantially according to the present principles.

The following structured query language (SQL) query implementing the exemplary storage classification method 100 of FIG. 2 will now be illustratively provided as an example. The following presents SQL code for a query that documents some of the blocks of the method 100 of FIG. 2. The SQL code is included herein only as an exemplary implementation.

It should be understood that this query is written with arbitrary naming conventions which will be understood for explanation purposes. Hence, the inventory table 104 of FIG. 2 is referred to in the query as "inventory_gal_unix," the installs table 106 of FIG. 2 is referred to in the query as "middleware_install_gal," the services table 108 of FIG. 2 is referred to in the query as "middleware_service_gal," the objects table 110 of FIG. 2 is referred to in the query as "middleware_object_gal," and the dependencies table 112 of FIG. 2 is referred to in the query as "middleware_dependencies_gal." Also the prefix "dbname." for each of the tables indicates the database name.

In its present form, the SQL query reports attributes, in addition to those posted in Table 10 and thus described within the embodiment. All the attributes in the query are [a] the method used to classify the storage ("METHOD"); [b] the host name as noted in Table 10 ("client_host_name"); [c] the host operating system ("client_os"); [d] the discovery status ("discovery_status_client"); [e] the mount point as noted in Table 10 ("mountpoint"); [f] a first attribute ("FS.fyi_mw_subclass"); [g] the file system ("filesys_type"); [h] the file system size in GB ("size_GB"); [i] the percent of the file system used ("FS.pct_used"); [j] the owner ("FS.owner"); [k] the owner group ("FS.owner_group"); [l] the permissions ("FS.permission"); [m] a second attribute ("FS.name"); [n] the installed storage driver as noted in Table 300 ("install.mw_distribution_name"); [o] the classification as noted in both Tables 10 and 300 ("CLASSIFICATION").

As mentioned previously, the SQL "union" statements bind together diverse sub queries that either resolve NAS storage or trace paths through the objects table 110 as noted in FIG. 3, the storage data model 200. The "where" statements are primarily used to restrict the table manipulations to include only storage related objects.

Hereafter, the SQL embodiment has been included to document, at least in part, logic/code that implements some of the methods described above. Note a function "sanitize_size_GB" appearing in the query normalizes the File System capacity, reporting it in terms of Giga bytes.

```
select distinct
   'NAS_FS_SORT' as METHOD,
   FS.host_name as client_host_name,
   Server.os_name as client_os,
   FS.discovery_status as discovery_status_client,
   FS.alias as mountpoint,
   FS.fyi_mw_class,
   FS.fyi_mw_subclass as filesys_type,
   dbname.sanitize_size_GB(FS.size) as size_GB,
   FS.pct_used,
   FS.owner, FS.owner_group, FS.permission,
   FS.name,
   'Not Relevant' as mw_distribution_name,
   'NAS' as CLASSIFICATION
from
   dbname.middleware_object_gal as FS,
   dbname.inventory_gal_unix as Server
where
   FS.host_name=Server.host_name and
   fyi_mw_class='FS' and
   object_type='mount' and
   (fyi_mw_subclass like 'NFS %' or
   fyi_mw_subclass like 'CIFS' or
   fyi_mw_subclass like 'AFS %' or
   fyi_mw_subclass like 'DFS')
union
select distinct
   'FS_DevFile_LVM_Disk_In' as METHOD,
   FS.host_name as client_host_name,
   Server.os_name as client_os,
   FS.discovery_status as discovery_status_client,
   FS.alias as mountpoint,
   FS.fyi_mw_class,
   FS.fyi_mw_subclass as filesys_type,
   dbname.sanitize_size_GB(FS.size) as size_GB,
   FS.pct_used,
   FS.owner, FS.owner_group, FS.permission,
   FS.name,
   install.mw_distribution_name,
   diskname.type as CLASSIFICATION
from
   dbname.middleware_object_gal as FS
   join   dbname.middleware_dependencies_gal   as
FS2DeviceFileLink
   on FS.mwid_gal=FS2DeviceFileLink.this_mwid_gal
   join dbname.middleware_object_gal as DeviceFile
```

```
    on     DeviceFile.mwid_gal=FS2DeviceFileLink.other_
       mwid_gal
    join      dbname.middleware_dependencies_gal      as
DeviceFile2LVLink
    on     DeviceFile.mwid_gal=DeviceFile2LVLink.other_
       mwid_gal
    join dbname.middleware_object_gal as LV
    on LV.mwid_gal=DeviceFile2LVLink.this_mwid_gal
    join      dbname.middleware_dependencies_gal      as
LV2DeviceFileLink
    on LV.mwid_gal=LV2DeviceFileLink.other_mwid_gal
    join dbname.middleware_object_gal as DISK
    on LV2DeviceFileLink.this_mwid_gal=DISK.mwid_gal
    join dbname.middleware_service_gal as service
    on service.mwid_gal=DISK.service_mwid_gal
    join dbname.middleware_install_gal as install
    on install.mwid_gal=service.INSTALL_MWID_GAL
    join dbname.inventory_gal_unix as Server
    on FS.host_name=Server.host_name
    left join dbname.diskname_classified as diskname
    on diskname.name=install.mw_distribution_name
where
    FS.host_name=Server.host_name and
    FS.fyi_mw_class='FS' and
    FS.object_type='mount' and
    DeviceFile.fyi_mw_class='FS' and
    DeviceFile.object_type='bdev' and
    DeviceFile2LVLink.direction='in' and
    LV.fyi_mw_class='BDEV' and
    LV.fyi_mw_subclass='LVM'
union
select distinct
    'FS_DevFile_LVM_Disk_Out' as METHOD,
    FS.host_name as client_host_name,
    Server.os_name as client_os,
    FS.discovery_status as discovery_status_client,
    FS.alias as mountpoint,
    FS.fyi_mw_class,
    FS.fyi_mw_subclass as filesys_type,
    dbname.sanitize_size_GB(FS.size) as size_GB,
    FS.pct_used,
    FS.owner, FS.owner_group, FS.permission,
    FS.name,
    install.mw_distribution_name,
    diskname.type as CLASSIFICATION
from
    dbname.middleware_object_gal as FS
    join      dbname.middleware_dependencies_gal      as
FS2DeviceFileLink
    on FS2DeviceFileLink.this_mwid_gal=FS.mwid_gal
    join dbname.middleware_object_gal as DeviceFile
    on     DeviceFile.mwid_gal=FS2DeviceFileLink.other_
       mwid_gal
    join      dbname.middleware_dependencies_gal      as
DeviceFile2LVLink
    on     DeviceFile2LVLink.other_mwid_gal=DeviceFile.
       mwid_gal
    join dbname.middleware_object_gal as LV
    on LV.mwid_gal=DeviceFile2LVLink.this_mwid_gal
    join      dbname.middleware_dependencies_gal      as
LV2DeviceFileLink
    on LV2DEviceFileLink.this_mwid_gal=LV.mwid_gal
    join dbname.middleware_object_gal as DISK
    on
       DISK.mwid_gal=LV2DeviceFileLink.other_mwid_gal
    join dbname.inventory_gal_unix as Server
    on FS.host_name=Server.host_name
    join dbname.middleware_service_gal as service
    on service.mwid_gal=DISK.service_mwid_gal
    join dbname.middleware_install_gal as install
    on install.mwid_gal=service.INSTALL_MWID_GAL
    left join dbname.diskname_classified as diskname
    on diskname.name=install.mw_distribution_name
where
    FS.fyi_mw_class='FS' and
    FS.object_type='mount' and
    DeviceFile.fyi_mw_class='FS' and
    DeviceFile.object_type='bdev' and
    LV.fyi_mw_class='BDEV' and
    LV.fyi_mw_subclass='LVM' and
    LV2DeviceFileLink.direction='out' and
    DISK.fyi_mw_subclass='DISK'
union
select distinct
    'FS_DevFile_Disk' as METHOD,
    FS.host_name as client_host_name,
    Server.os_name as client_os,
    FS.discovery_status as discovery_status_client,
    FS.alias as mountpoint,
    FS.fyi_mw_class,
    FS.fyi_mw_subclass as filesys_type,
    dbname.sanitize_size_GB(FS.size) as size_GB,
    FS.pct_used,
    FS.owner, FS.owner_group, FS.permission,
    FS.name,
    install.mw_distribution_name,
    diskname.type as CLASSIFICATION
from
    dbname.middleware_object_gal as FS
    join  dbname.middleware_dependencies_gal  as  FS2
DeviceFile
    on FS.mwid_gal=FS2DeviceFile.this_mwid_gal
    join dbname.middleware_object_gal as DeviceFile
    on
       DeviceFile.mwid_gal=FS2DeviceFile.other_mwid_gal
    join dbname.middleware_dependencies_gal as Device
File2DISK
    on     DeviceFile.mwid_gal=DeviceFile2DISK.other_
       mwid_gal
    join dbname.middleware_object_gal as DISK
    on DISK.mwid_gal=DeviceFile2DISK.this_mwid_gal
    join dbname.middleware_service_gal as service
    on service.mwid_gal=DISK.service_mwid_gal
    join dbname.middleware_install_gal as install
    on install.mwid_gal=service.INSTALL_MWID_GAL
    join dbname.inventory_gal_unix as Server
    on FS.host_name=Server.host_name
    left join dbname.diskname_classified as diskname
    on diskname.name=install.mw_distribution_name
where
    FS.fyi_mw_class='FS' and
    FS.object_type='mount' and
    DeviceFile.fyi_mw_class='FS' and
    DeviceFile.object_type='bdev' and
    DISK.fyi_mw_class='BDEV' and
    DISK.fyi_mw_subclass='DISK' and
    diskname.class='BDEV' and
    diskname.subclass='DISK'
union
select distinct
    'FS_Disk' as METHOD,
    FS.host_name as client_host_name,
    Server.os_name as client_os,
    FS.discovery_status as discovery_status_client,
```

FS.alias as mountpoint,
FS.fyi_mw_class,
FS.fyi_mw_subclass as filesys_type,
dbname.sanitize_size_GB(FS.size) as size_GB,
FS.pct_used,
FS.owner, FS.owner_group, FS.permission,
FS.name,
install.mw_distribution_name,
diskname.type as CLASSIFICATION
from
    dbname.middleware_object_gal as FS
    join dbname.middleware_dependencies_gal as FS2DISK
      on FS.mwid_gal=FS2DISK.other_mwid_gal
    join dbname.middleware_object_gal as DISK
      on DISK.mwid_gal=FS2DISK.this_mwid_gal
    join dbname.middleware_service_gal as service
      on service.mwid_gal=DISK.service_mwid_gal
    join dbname.middleware_install_gal as install
      on install.mwid_gal=service.INSTALL_MWID_GAL
    join dbname.inventory_gal_unix as Server
      on FS.host_name=Server.host_name
    left join dbname.diskname_classified as diskname
      on diskname.name=install.mw_distribution_name
where
    FS.fyi_mw_class='FS' and
    FS.object_type='mount' and
    DISK.fyi_mw_class='BDEV' and
    DISK.fyi_mw_subclass='DISK' and
    diskname.class='BDEV' and
    diskname.subclass='DISK'

Figure 9:
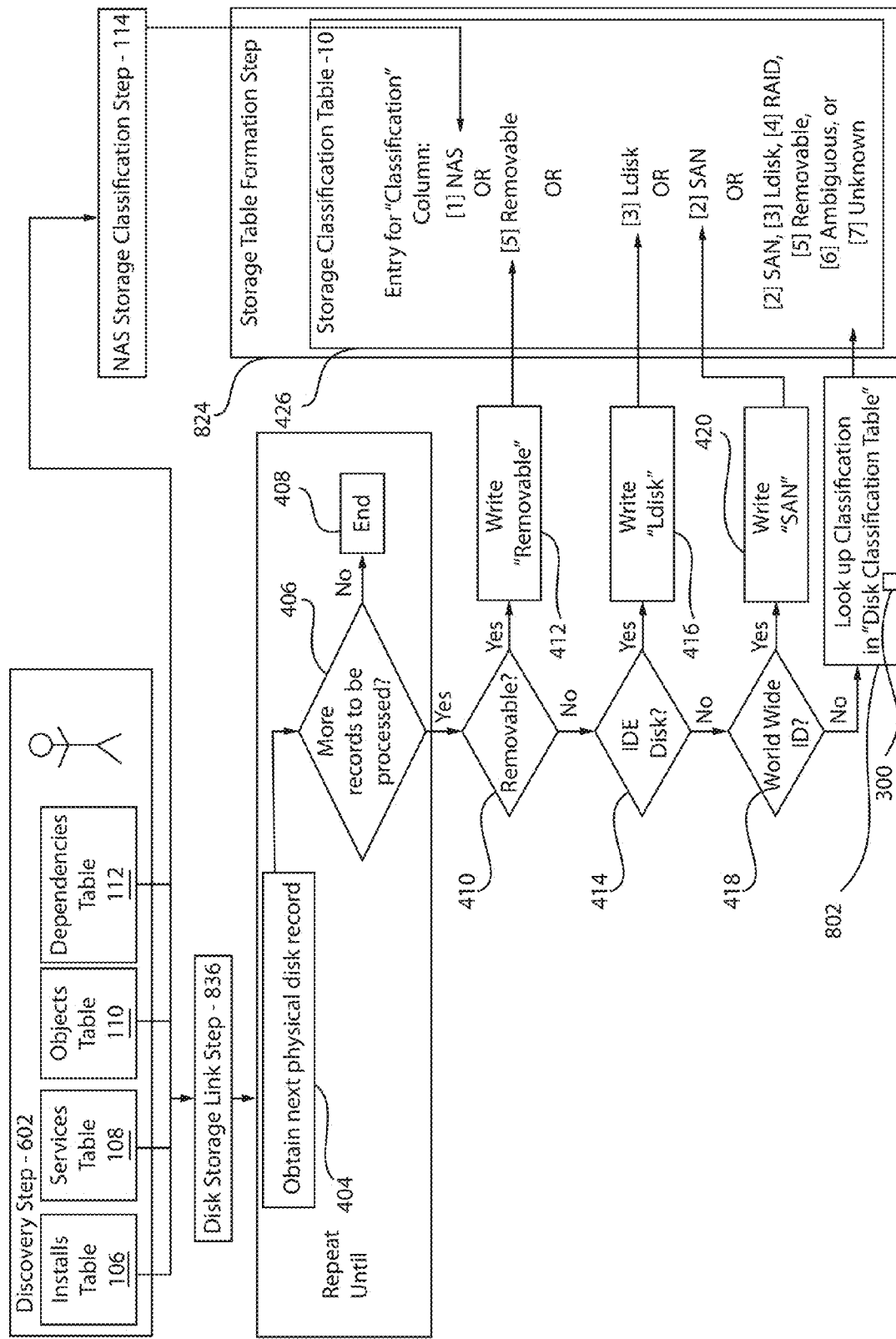
FIG. 9 is a block/flow diagram showing a system/method for combining a plurality of classification methods in accordance with another embodiment.

Referring to FIG. 9, tightly integrating the storage classification method 100 with the disk classification method 400 improves accuracy of each classification rendered on a storage record (e.g., host name and mount point of file system) and enlarges the coverage of classifications across all storage records. FIG. 9 depicts an illustrative tightly integrated method 800. The description of method 800 will later be augmented with illustrative SQL code. One important observation about this method 800 is that in block 802 a look up classification in a disk classification table step is a catcher step for classifications that may not be covered by the discovery needed to respond to questions posed within blocks 410, 414, and 418. In other words, if discovery agents or processes do not succeed in gathering Removable, IDE, and WWID status (described above with reference to FIG. 5), either because they were not run during the discovery process or because a suitable discovery agent does not exist (was not designed) for a particular operating system, then the look-up step in block 802 may be able to classify the storage using, e.g., Table 300.

The disk storage link in block 836 links file systems, which are not NAS, to the disk objects (i.e., physical disks). A link from the file system mount point to a disk is made by traversing from box to box, the objects (represented in the objects table 110) along the flow lines (represented in the dependencies table 112), which are both represented within the storage data model 200 of FIG. 3. In other words, the link is made by tracing tables from the file system mount points, through any intermediate file system objects, to the disk objects.

Since a disk is obtained in block 836, the look-up step in block 802 first links to the installation that created it, e.g., a storage driver. Then, the installed storage driver 302 may be looked up in the disk classification table 300 to obtain the storage classification 304. Thus, the storage classification may be linked back to the mount point. Classifications that result from block 802 may include [2] SAN, [3] Ldisk, [4] RAID, [5] Removable, [6] Ambiguous, or [7] Unknown.

The storage table formation step in block 824 amalgamates the results written by blocks 114, 412, 416, 420 and 802 into the storage classification table 10. Accordingly, a portion of a SQL query will next be described that implements method 800 of FIG. 9.

Note that the previous conventions of the SQL query implementing the exemplary storage classification method 100 of FIG. 2 set forth above are retained herein with this description. This section includes SQL code that documents a table traversal, covering an exemplary "Mount Point" object to "Disk" object path of FIG. 3, FS_DevFile_LVM_Disk_In statement 204. The complete SQL code for implementing the method of FIG. 9 may be devised by making the alterations to each of the other "Mount Point" to "Disk" paths as will be described with respect to the FS_DevFile_LVM_Disk_In path 204.

The SQL "union" statements bind together diverse sub queries that have additional constraints imposed primarily through the SQL "where" clause. As previously described, the "where" constraints were used to restrict the table manipulations to include only storage related objects. The "where" clauses provide further restrictions that constrain paths to lead to a particular classification (i.e. Removable or Disk or SAN) or to a table look up (e.g., Table 300). Suffixes have been added to designate the purpose of each METHOD (actually the column heading of "METHOD," in this context, is a sub query). The new methods include:
    1) FS_DevFile_LVM_Disk_In_Removable→classify as Removable;
    2) FS_DevFile_LVM_Disk_In_IDE→classify as Disk;
    3) FS_DevFile_LVM_Disk_In_WWID→classify as SAN;
    4) FS_DevFile_LVM_Disk_In_Disk_Classification_Table→ Lookup up disk classification in Table 300.

The SQL is written in such a way that each single record is tested for each possible path. The additional SQL "where" restrictions follow: 1) FS_DevFile_LVM_Disk_In_Removable is DISK.description like '% Removable %'. The additional SQL "where" restrictions for 2) FS_DevFile_LVM_Disk_In_IDE are a) DISK.description not like '% Removable %' and b) DISK.description like '% IDE %'. The additional SQL "where" restrictions for 3) FS_DevFile_LVM_Disk_In_WWID are a) DISK.description not like '% Removable %' and b) DISK.description not like '% IDE %' and c) DISK.description like '% WWID %'. The additional SQL "where" restrictions for 4) FS_DevFile_LVM_Disk_In_Disk_Classification_Table are a) DISK.description not like '% Removable %' and b) DISK.description not like '% IDE %' and c) DISK description not like '% WWID %'.

It should be understood that the strings '% Removable %', '% IDE %', and '% WWID %' are not actually the primary output of the discovery scripts that are run on host computer systems but rather are terms added by an intermediary parsing process (which may be considered part of the discovery engine or the classifier) that unify the primary output discovered within various fields and files of various operating systems. As was discussed with respect to Table 500 (of FIG. 6), the primary output collected for this classification process is often unique to each operating system.

The SQL query for FS_DevFile_LVM_Disk_In path 204 follows:
    select distinct
    'FS_DevFile_LVM_Disk_In_Removable' as METHOD,
    FS.host_name as client_host_name,
    Server.os_name as client_os,

```
    FS.discovery_status as discovery_status_client,
    FS.alias as mountpoint,
    FS.fyi_mw_class,
    FS.fyi_mw_subclass as filesys_type,
    dbname.sanitize_size_GB(FS.size) as size_GB,
    FS.pct_used,
    FS.owner, FS.owner_group, FS.permission,
    FS.name,
    install.mw_distribution_name,
    'Removable' as CLASSIFICATION
from
    dbname.middleware_object_gal as FS
        join    dbname.middleware_dependencies_gal    as
FS2DeviceFileLink
        on FS.mwid_gal=FS2DeviceFileLink.this_mwid_gal
    join dbname.middleware_object_gal as DeviceFile
        on    DeviceFile.mwid_gal=FS2DeviceFileLink.other_
            mwid_gal
        join    dbname.middleware_dependencies_gal    as
DeviceFile2LVLink
        on    DeviceFile.mwid_gal=DeviceFile2LVLink.other_
            mwid_gal
    join dbname.middleware_object_gal as LV
        on LV.mwid_gal=DeviceFile2LVLink.this_mwid_gal
        join    dbname.middleware_dependencies_gal    as
LV2DeviceFileLink
        on LV.mwid_gal=LV2DeviceFileLink.other_mwid_gal
    join dbname.middleware_object_gal as DISK
        on LV2DeviceFileLink.this_mwid_gal=DISK.mwid_gal
    join dbname.middleware_service_gal as service
        on service.mwid_gal=DISK.service_mwid_gal
    join dbname.middleware_install_gal as install
        on install.mwid_gal=service.INSTALL_MWID_GAL
    join dbname.inventory_gal_unix as Server
        on FS.host_name=Server.host_name
where
    FS.host_name=Server.host_name and
    FS.fyi_mw_class='FS' and
    FS.object_type='mount' and
    DeviceFile.fyi_mw_class='FS' and
    DeviceFile.object_type='bdev' and
    DeviceFile2LVLink.direction='in' and
    LV.fyi_mw_class='BDEV' and
    LV.fyi_mw_subclass='LVM' and
    DISK.description like '% Removable %'
union
select distinct
    'FS_DevFile_LVM_Disk_In_IDE' as METHOD,
    FS.host_name as client_host_name,
    Server.os_name as client_os,
    FS.discovery_status as discovery_status_client,
    FS.alias as mountpoint,
    FS.fyi_mw_class,
    FS.fyi_mw_subclass as filesys_type,
    dbname.sanitize_size_GB(FS.size) as size_GB,
    FS.pct_used,
    FS.owner, FS.owner_group, FS.permission,
    FS.name,
    install.mw_distribution_name,
    'Ldisk' as CLASSIFICATION
from
    dbname.middleware_object_gal as FS
        join    dbname.middleware_dependencies_gal    as
FS2DeviceFileLink
        on FS.mwid_gal=FS2DeviceFileLink.this_mwid_gal
    join dbname.middleware_object_gal as DeviceFile
        on    DeviceFile.mwid_gal=FS2DeviceFileLink.other_
            mwid_gal
        join    dbname.middleware_dependencies_gal    as
DeviceFile2LVLink
        on    DeviceFile.mwid_gal=DeviceFile2LVLink.other_
            mwid_gal
    join dbname.middleware_object_gal as LV
        on LV.mwid_gal=DeviceFile2LVLink.this_mwid_gal
        join    dbname.middleware_dependencies_gal    as
LV2DeviceFileLink
        on LV.mwid_gal=LV2DeviceFileLink.other_mwid_gal
    join dbname.middleware_object_gal as DISK
        on LV2DeviceFileLink.this_mwid_gal=DISK.mwid_gal
    join dbname.middleware_service_gal as service
        on service.mwid_gal=DISK.service_mwid_gal
    join dbname.middleware_install_gal as install
        on install.mwid_gal=service.INSTALL_MWID_GAL
    join dbname.inventory_gal_unix as Server
        on FS.host_name=Server.host_name
where
    FS.host_name=Server.host_name and
    FS.fyi_mw_class='FS' and
    FS.object_type='mount' and
    DeviceFile.fyi_mw_class='FS' and
    DeviceFile.object_type='bdev' and
    DeviceFile2LVLink.direction='in' and
    LV.fyi_mw_class='BDEV' and
    LV.fyi_mw_subclass='LVM' and
    DISK.description not like '% Removable %' and
    DISK.description like '% IDE %'
union
select distinct
    'FS_DevFile_LVM_Disk_In_WWID' as METHOD,
    FS.host_name as client_host_name,
    Server.os_name as client_os,
    FS.discovery_status as discovery_status_client,
    FS.alias as mountpoint,
    FS.fyi_mw_class,
    FS.fyi_mw_subclass as filesys_type,
    dbname.sanitize_size_GB(FS.size) as size_GB,
    FS.pct_used,
    FS.owner, FS.owner_group, FS.permission,
    FS.name,
    install.mw_distribution_name,
    'SAN' as CLASSIFICATION
from
    dbname.middleware_object_gal as FS
        join    dbname.middleware_dependencies_gal    as
FS2DeviceFileLink
        on FS.mwid_gal=FS2DeviceFileLink.this_mwid_gal
    join dbname.middleware_object_gal as DeviceFile
        on DeviceFile.mwid_gal=FS2DeviceFileLink.other_wid-
            _gal
        join    dbname.middleware_dependencies_gal    as
DeviceFile2LVLink
        on    DeviceFile.mwid_gal=DeviceFile2LVLink.other_
            mwid_gal
    join dbname.middleware_object_gal as LV
        on LV.mwid_gal=DeviceFile2LVLink.this_mwid_gal
        join    dbname.middleware_dependencies_gal    as
LV2DeviceFileLink
        on LV.mwid_gal=LV2DeviceFileLink.other_mwid_gal
    join dbname.middleware_object_gal as DISK
        on LV2DeviceFileLink.this_mwid_gal=DISK.mwid_gal
    join dbname.middleware_service_gal as service
        on service.mwid_gal=DISK.service_mwid_gal
    join dbname.middleware_install_gal as install
```

```
on install.mwid_gal=service.INSTALL_MWID_GAL
join dbname.inventory_gal_unix as Server
  on FS.host_name=Server.host_name
where
  FS.host_name=Server.host_name and
  FS.fyi_mw_class='FS' and
  FS.object_type='mount' and
  DeviceFile.fyi_mw_class='FS' and
  DeviceFile.object_type='bdev' and
  DeviceFile2LVLink.direction='in' and
  LV.fyi_mw_class='BDEV' and
  LV.fyi_mw_subclass='LVM' and
  DISK.description not like '% Removable %' and
  DISK.description not like '% IDE %' and
  DISK.description like '% WWID %'
union
select distinct
  'FS_DevFile_LVM_Disk_In_Disk_Classification_Table'
    as METHOD,
  FS.host_name as client_host_name,
  Server.os_name as client_os,
  FS.discovery_status as discovery_status_client,
  FS.alias as mountpoint,
  FS.fyi_mw_class,
  FS.fyi_mw_subclass as filesys_type,
  dbname.sanitize_size_GB(FS.size) as size_GB,
  FS.pct_used,
  FS.owner, FS.owner_group, FS.permission,
  FS.name,
  install.mw_distribution_name,
  diskname.type as CLASSIFICATION
from
  dbname.middleware_object_gal as FS
  join   dbname.middleware_dependencies_gal   as
FS2DeviceFileLink
    on FS.mwid_gal=FS2DeviceFileLink.this_mwid_gal
  join dbname.middleware_object_gal as DeviceFile
    on    DeviceFile.mwid_gal=FS2DeviceFileLink.other_
      mwid_gal
  join   dbname.middleware_dependencies_gal   as
DeviceFile2LVLink
    on    DeviceFile.mwid_gal=DeviceFile2LVLink.other_
      mwid_gal
  join dbname.middleware_object_gal as LV
    on LV.mwid_gal=DeviceFile2LVLink.this_mwid_gal
  join   dbname.middleware_dependencies_gal   as
LV2DeviceFileLink
    on LV.mwid_gal=LV2DeviceFileLink.other_mwid_gal
  join dbname.middleware_object_gal as DISK
    on LV2DeviceFileLink.this_mwid_gal=DISK.mwid_gal
  join dbname.middleware_service_gal as service
    on service.mwid_gal=DISK.service_mwid_gal
  join dbname.middleware_install_gal as install
    on install.mwid_gal=service.INSTALL_MWID_GAL
  join dbname.inventory_gal_unix as Server
    on FS.host_name=Server.host_name
  left join dbname.diskname_classified as diskname
    on diskname.name=install.mw_distribution_name
where
  FS.host_name=Server.host_name and
  FS.fyi_mw_class='FS' and
  FS.object_type='mount' and
  DeviceFile.fyi_mw_class='FS' and
  DeviceFile.object_type='bdev' and
  DeviceFile2LVLink.direction='in' and
  LV.fyi_mw_class='BDEV' and
  LV.fyi_mw_subclass='LVM' and
  DISK.description not like '% Removable %' and
  DISK.description not like '% IDE %' and
  DISK.description not like '% WWID %'
```

Figure 10:
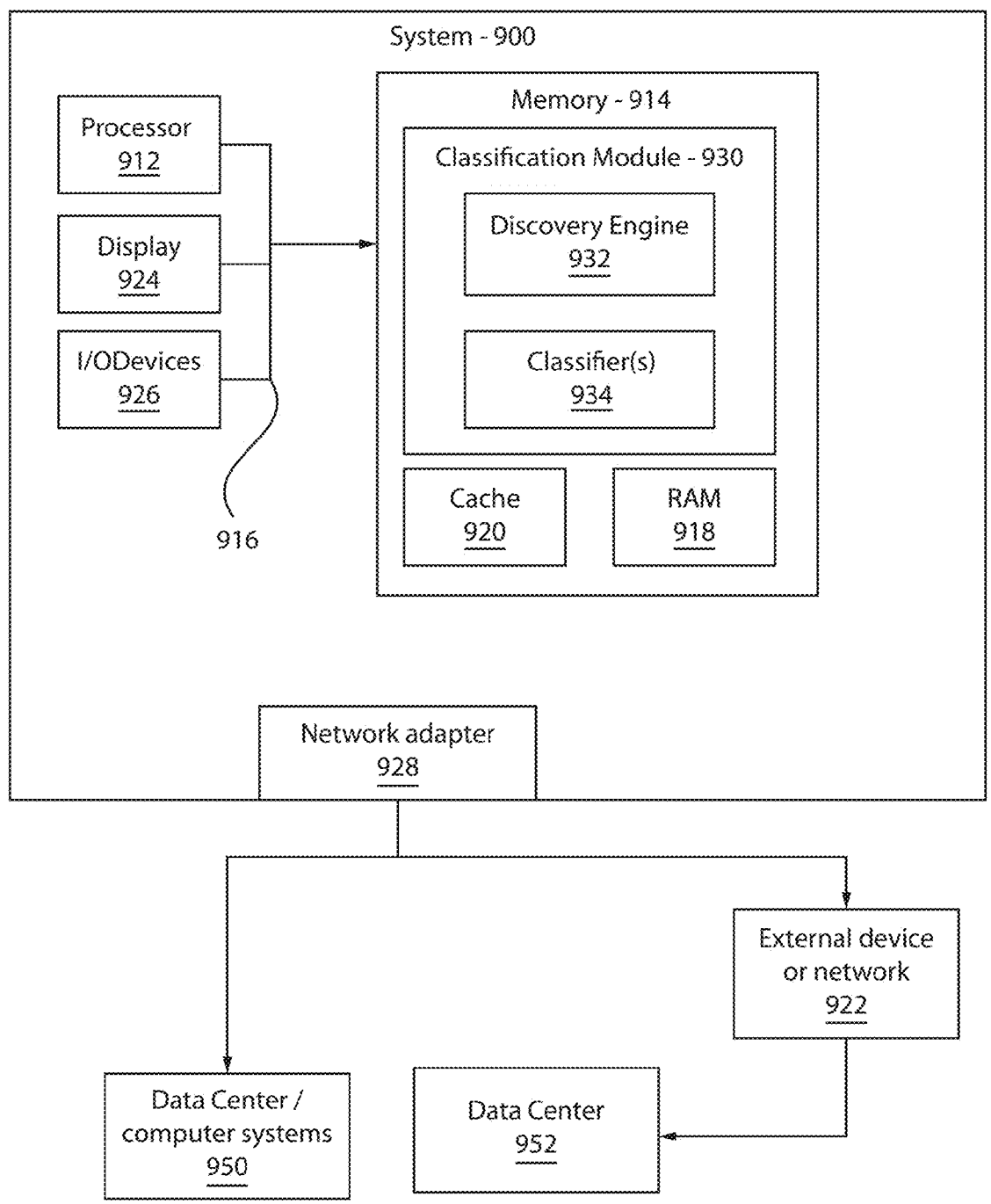
FIG. 10 is a block/flow diagram showing an illustrative system for carrying out the methods in accordance with the present principles.

Referring to FIG. 10, a system 900 is illustratively depicted to carry out the present principles. It should be understood that the present principles may be carried out over a distributed system or network and may include input from one or more individuals. System 900 is shown in a basic form and may be included in a larger system or network, may be employed in a cloud computing node, may be employed as a server or set of servers, etc. These examples are illustrative of suitable applications and are not intended to suggest any limitation as to the scope of use or functionality of embodiments described herein. Regardless, system 900 is capable of being implemented and/or performing any of the functions set forth herein.

System 900 may be operational with numerous other general purpose or special purpose computing system environments or configurations. Examples of well-known computing systems, environments, and/or configurations that may be suitable for use with system 900 include, but are not limited to, personal computer systems, server computer systems, thin clients, thick clients, hand-held or laptop devices, microprocessor-based systems, set top boxes, programmable consumer electronics, network PCs, minicomputer systems, mainframe computer systems, data centers and distributed cloud computing environments that include any of the above systems or devices, and the like.

System 900 may be described in the general context of computer system-executable instructions, such as program modules, being executed by a computer system. Generally, program modules may include routines, programs, objects, components, logic, data structures, and so on that perform particular tasks or implement particular abstract data types. System 900 may be practiced in distributed cloud computing or other network environments where tasks are performed by remote processing devices that are linked through a communications network. In a distributed cloud computing environment or network, program modules may be located in both local and remote computer system storage media including memory storage devices.

System 900 is shown in the form of a general-purpose computing device. The components of computer system 900 may include, but are not limited to, one or more processors or processing units 912, a system memory 914 and a bus 916 that couples various system components including system memory 914 and processing units 912.

Bus 916 represents one or more of any of several types of bus structures, including a memory bus or memory controller, a peripheral bus, an accelerated graphics port, and a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus, etc.

Computer system 900 may include a variety of computer system readable media. Such media may be any available media that is accessible by computer system 900, and it includes both volatile and non-volatile media, removable and non-removable media.

System memory 914 may include computer system readable media in the form of volatile memory, such as random access memory (RAM) 918 and/or cache memory 920. Computer system 900 may further include other removable/non-removable, volatile/non-volatile computer system storage media. By way of example only, system memory 914 can be provided for reading from and writing to a non-removable, non-volatile magnetic media (e.g., a hard drive). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 916 by one or more data media interfaces. As will be further depicted and described below, memory 914 may include at least one program product having a set (e.g., at least one) of program modules that are configured to carry out the functions of embodiments in accordance with the present principles.

A classification system module 930 may be stored in memory 914. The classification system module 930 may include, for example, an operating system, one or more application programs, other program modules and program data. The module 930 may include an analysis tool or tools for the classification of non-volatile or permanent memory storage and allocated memory for the various tables, as described with reference to FIGS. 1-9 herein. The module 930 carries out the functions and/or methodologies of the present embodiments as described herein.

Computer system 900 may also communicate with one or more input/output devices 926 such as a keyboard, a pointing device, a display 924, etc.; one or more devices that enable a user to interact with computer system 900; and/or any devices (e.g., network adapter or card 928, modem, etc.) that enable computer system 900 to communicate with one or more other computing devices. Computer system 900 can communicate with one or more external devices or networks 922 such as a local area network (LAN), a wide area network (WAN), cloud and/or a public network (e.g., the Internet) via the network adapter 928. Network adapter 928 communicates with the other components of computer system via bus 916.

It should be understood that although not shown, other hardware and/or software modules could be employed in conjunction with computer system 900. Examples, include, but are not limited to: microcode, device drivers, redundant processing units, external disk drive arrays, RAID systems, tape drives, and data archival storage systems, etc. In a particularly useful, embodiment, the system 900 is employed with or in a data center environment for the classification of storage.

In one embodiment, the module 930 is configured to analyze storage systems on one or more data centers 950, 952 or other computer systems. The one or more computer systems, servers, collection of servers, networks or data centers 950, 952 may include a plurality of different memory hardware configurations that may be classified in accordance with the present principles. The data centers 950 and 952 may be the target of the discovery and classification methods in accordance with the present principles. It should be understood that other memory storage systems, environments, etc. are also contemplated.

In a particularly useful embodiment, the program module 930 includes a discovery engine 932 configured to discover an identity and location of one or more files in one or more computer systems (e.g., in a data center). "Files" is a general term that refers to and includes file systems, file directories (e.g., UNIX implements directories as files), mount points, object stores, etc. The discovery engine 932 navigates through memory storage systems to identify attributes of the storage device with the memory content or files.

The discovery engine 932 discovers the files logically (e.g., the mount points) and then follows linkages to physical storage (e.g., via logical volumes, local disk drivers, see FIG. 3)). This may be performed on a file-by-file approach until all files are read. The discovery engine 932 employs at least one classifier 934 to classify the files into a classification and associate the classification with the respective file. The classification may be based on hardware or memory types, a speed of a memory (e.g., based on its location on which the file is stored), a location of the memory, etc. The classifiers may include distinct methods (e.g., method 100, method 400, etc.) that each generate at least a partial classification result that is amalgamated or assembled into a best classification result. The classification result may include a comparison of differences among the plurality of classification methods that are flagged when compared (to provide an indication of any difference (e.g., discrepancy, equivalent. one results, etc.).

The two processes of discovery and classification are intertwined. For example, the discovery engine 932 and classifier(s) 934 have been shown herein together on the same system 900 in FIG. 10. Other systems may have the discovery engine 932 and classifier(s) 934 on different systems. The discovery engine 932 may be run on one or more systems whose storage attributes need to be discovered and then classified while the classifier(s) 934 may be run on an analysis system where the discovery results from the one or more systems have been collected.

Having described preferred embodiments of a system and method for the classification of storage (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A classification system executing on one or more computer systems, comprising:
    a processor;
    a memory coupled to the processor, the memory includes:
        a discovery engine configured to navigate through non-volatile memory storage to discover an identity and location of one or more files in one or more computer storage systems by tracing the one or more files from file system mount points through intermediate file system objects and to disk objects; and
        at least one classifier configured to classify the one or more files into a classification category, the one or more files being associated with the classification category and stored in at least one data structure,
    wherein the one or more files are classified using an installed storage driver method.

2. The system as recited in claim 1, wherein the classification category includes a type of memory on which the one or more files are stored and a location of the one or more files.

3. The system as recited in claim 1, wherein the classification category is selected from at least network attached storage (NAS), storage area network (SAN), disk and removable.

4. The system as recited in claim 3, wherein the classification category for the disk is further classified into protected and not protected using a redundant array of independent disks (RAID) classification.

5. The system as recited in claim 1, wherein the classification category includes an ambiguous class where further information is needed to determine a different classification category type.

6. The system as recited in claim 1, wherein the classification category includes an unknown class.

7. The system as recited in claim 1, wherein the at least one classifier includes one or more of an objects table and a dependencies table to analyze the one or more files.

8. The system as recited in claim 1, wherein at least one of the one or more files are further classified using a physical disk classification method.

9. The system as recited in claim 1, wherein the at least one data structure includes a storage classification having each discovered file system recorded with a host or server name, a mount point, and the classification category.

10. A method for classifying storage comprising:
   discovering an identity and location of one or more files in one or more computer systems;
   classifying the one or more files into a classification category by resolving types of storage classifications by tracing the one or files from file system mount points through intermediate file system objects to disk objects; and
   associating the one or more files with the classification category in at least one data structure stored on a storage medium,
   wherein the one or more files are classified using an installed storage driver method.

11. The method as recited in claim 10, wherein the classification category includes a type of the memory on which the one or more files are stored and a location of the one or more files.

12. The method as recited in claim 10, wherein the classification category is selected from at least network attached storage (NAS), storage area network (SAN), disk, and removable.

13. The method as recited in claim 10, wherein the classification category includes an ambiguous class where further information is needed to determine a different classification category type and an unknown class.

14. The method as recited in claim 10, further comprising parsing the identity and location of one or more files using one or more tables including an objects table and a dependencies table to provide data for classification analysis.

15. The method as recited in claim 10, wherein classifying includes classifying at least one of the one or more files further using a physical disk classification method.

16. The method as recited in claim 15, further comprising:
   comparing similar records generated by both the installed storage driver classification method and the physical disk classification method; and
   indicating similarities or differences between the records using a flag.

17. The method as recited in claim 16, wherein the flag may include one of equivalency, discrepancy and single result, if no counterpart record exists.

18. The method as recited in claim 10, wherein associating the one or more files includes storing a storage classification having each discovered file system or physical disk with a host or server name, a mount point, and the classification category in a storage classification table.

19. A computer readable storage medium comprising a computer readable program for classifying storage, wherein the computer readable program when executed on a computer causes the computer to perform the steps of:
   discovering an identity and location of one or more files in one or more computer systems;
   classifying the one or more files into a classification category by resolving types of storage classifications by tracing the one or files from file system mount points through intermediate file system objects to disk objects; and
   associating the one or more files with the classification category in at least one data structure stored on a storage medium, wherein the one or more files are classified using an installed storage driver method.

20. The computer readable storage medium as recited in claim 19, wherein the classification category includes a type of the memory on which the one or more files are stored and a location of the one or more files.

* * * * *